(12) United States Patent
Lo et al.

(10) Patent No.: US 10,365,626 B2
(45) Date of Patent: Jul. 30, 2019

(54) EXTENDING THE FUNCTIONALITY OF A PROGRAMMABLE LOGIC CONTROLLER (PLC) WITH APPS WITHOUT CHANGING THE PLC PROGRAMMING

(71) Applicant: Siemens Aktiengesellschaft, Munich (DE)

(72) Inventors: George Lo, Langhorne, PA (US);
Thomas Gruenewald, Somerset, NJ (US); Phani Ram Kumar Kuruganty, East Windsor, NJ (US); Kurt Dirk Bettenhausen, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 546 days.

(21) Appl. No.: 15/040,565

(22) Filed: Feb. 10, 2016

(65) Prior Publication Data
US 2016/0239011 A1 Aug. 18, 2016

Related U.S. Application Data

(60) Provisional application No. 62/115,410, filed on Feb. 12, 2015.

(51) Int. Cl.
*G05B 19/05* (2006.01)
*G05B 19/042* (2006.01)

(52) U.S. Cl.
CPC .......... *G05B 19/05* (2013.01); *G05B 19/042* (2013.01); *G05B 2219/15116* (2013.01)

(58) Field of Classification Search
CPC .............. G05B 19/05; G05B 19/042; G05B 2219/15116; G05B 2219/23297; G06F 11/00

USPC .......... 700/86, 185, 182, 184, 188
See application file for complete search history.

(56) References Cited

U.S. PATENT DOCUMENTS

| | | | |
|---|---|---|---|
| 2006/0271263 A1* | 11/2006 | Self | G01S 3/143 701/50 |
| 2009/0065578 A1* | 3/2009 | Peterson | G05B 19/048 235/382 |
| 2011/0260581 A1* | 10/2011 | Ghoshal | H01L 27/20 310/323.21 |
| 2015/0073751 A1* | 3/2015 | Liao | G06F 11/00 702/185 |
| 2017/0154017 A1* | 6/2017 | Kristiansson | G06F 8/60 |
| 2018/0011465 A1* | 1/2018 | Lo | G05B 19/05 |

FOREIGN PATENT DOCUMENTS

| | | |
|---|---|---|
| WO | 2013155421 A1 | 10/2013 |
| WO | 2013191684 A1 | 12/2013 |

OTHER PUBLICATIONS

International Search Report received May 13, 2016; PCT/US2016/17655; Filing date: Feb. 12, 2016; 11 pages.

* cited by examiner

*Primary Examiner* — Gene N Auduong (57) ABSTRACT

A programmable logic controller comprises a processor, a PLC operating environment, a device memory, and an app container. The PLC operating environment is configured to execute a controller automation program providing a plurality of skill functions. The device memory comprises a plurality of apps which are configured to perform a discrete set of automation functions using the plurality of skill functions. The app container is logically separate from the PLC operating environment and configured to provide a runtime environment for the apps.

22 Claims, 9 Drawing Sheets

EXTENDING THE FUNCTIONALITY OF A PROGRAMMABLE LOGIC CONTROLLER (PLC) WITH APPS WITHOUT CHANGING THE PLC PROGRAMMING

CROSS-REFERENCE TO RELATED APPLICATIONS

This application claims the benefit of U.S. Provisional Application Ser. No. 62/115,410 filed Feb. 12, 2015, which is incorporated herein by reference in its entirety.

TECHNICAL FIELD

The present invention relates generally to systems, methods, and apparatuses for extending programmable logic controllers (PLC) with an App Runtime Environment configured to execute one or more discrete software applications, or "apps." The disclosed technology may be applied, for example, to enhance the flexibility of the controller to different automation scenarios.

BACKGROUND

A programmable logic controller (PLC) is a specialized automation device used in industrial environments. PLCs are configured to execute software which continuously gathers data on the state of input devices to control the state of output devices. A PLC typically includes three major components: a processor (which includes volatile memory), non-volatile memory comprising an application program, and input/output (I/O) ports for connecting to other devices in the automation system.

One of the challenges of effectively operating and maintaining PLCs is that, traditionally, these systems have been very inflexible. In particular, it is difficult to modify the behavior and operation of PLCs once they have been installed and configured. The lack of flexibility in PLCs generally, restricts the level of customization that the device owner can perform. For example, a device owner may purchase several PLCs programmed to perform certain functionality. Over time, the device owner may wish to modify or extend that functionality, based on the needs of the owner's business, as well as other new or changing customer demands. With conventional systems, device specialists (e.g., engineers) must redesign the device software to perform the desired functionality. Then, installation of the redesigned software on the PLC requires the PLC to be stopped, updated, and restarted. This approach to software changes can be costly, as factory operations may need to be temporarily halted until the update is complete.

SUMMARY

Embodiments of the present invention address and overcome one or more of the above shortcomings and drawbacks, by providing methods, systems, and apparatuses related to extending a programmable logic controller with apps. Briefly, the techniques described herein use a combination of an App Container and Real-time Data Backbone (RTDB) to provide an operating environment for apps on a controller. This operating environment enhances the flexibility of the controller by making processes more modular. For example, using the techniques described herein, an App can be stateless, and can be added, replaced or removed to a controller without impacting other apps, thereby providing a "Plug-n-Play" implementation while running.

According to some embodiments, a programmable logic controller comprises a processor, a PLC operating environment, a device memory, and an app container. The PLC operating environment is configured to execute a controller automation program providing a plurality of skill functions. The device memory comprises a plurality of apps which are configured to perform a discrete set of automation functions using the plurality of skill functions. The app container is logically separate from the PLC operating environment and configured to provide a runtime environment for the apps. This app container may include, for example, a local shared memory which is loaded prior to execution of the apps during a scan cycle. Execution of the apps may be triggered, for example in response to external events or according to a scan cycle.

In some embodiments, the aforementioned programmable logic controller further comprises a real-time data backbone configured to maintain state information associated with the plurality of skill functions and the plurality of apps. Additionally, the programmable logic controller may include a communications container configured to facilitate communication between the real-time data backbone and one or more external sources. These external sources may include, for example, a second real-time data backbone in a second programmable logic controller.

In some embodiments of the aforementioned programmable logic controller, the plurality of apps comprises one or more app sequences and the app container is configured to execute each of the one or more app sequences in one or more single threaded schedulers. The app container may then sequentially execute apps included in each of the app sequences. In one embodiment, each app sequence is executed by a distinct single threaded scheduler. The apps may also include one or more un-sequenced apps executing asynchronously in a thread that is distinct from each distinct single thread scheduler used to execute the app sequences.

According to other embodiments, a second type of programmable logic controller includes a PLC operating environment, a device memory, a first instance of an app container, and a second instance of an app container. The PLC operating environment is configured to execute a controller automation program providing a plurality of skill functions. The device memory comprises apps configured to perform a discrete set of automation functions using the skill functions. The first instance of an app container is logically separate from the PLC operating environment and configured to provide a first runtime environment for a first subset of the apps. The second instance of the app container is also logically separate from the PLC operating environment and is configured to provide a second runtime environment for a second subset of the apps. The first and second subset of apps may comprise, for example, cycle-synchronous apps and free running apps, respectively. In some embodiments, the aforementioned second type of programmable logic controller further comprising a real-time data backbone operably coupled to the first instance of the app container and the second instance of the app container. This real-time data backbone is configured to maintain state information associated with the apps. Additionally, in some embodiments, the real-time data backbone also includes state information related to the process under control (i.e., I/Os)

In the aforementioned second type of programmable logic controller, wherein the first instance of the app container and the second instance of the app container may each comprise a local shared memory updated with app state information during a scan cycle of the controller. Partitioning of the two app containers allows for distinct execution of apps in different embodiments. For example, in one embodiment, the first subset of apps comprises app sequences which are sequentially executed in a distinct single threaded scheduler. The second subset apps may then comprise un-sequenced apps executing asynchronously in a thread distinct from each distinct single thread scheduler.

According to other embodiments, a programmable logic controller includes a PLC operating environment, one or more app containers, and a real-time data backbone. In these embodiments, the PLC operating environment is configured to execute a controller automation program. The one or more app containers are configured to provide a runtime environment for the plurality of apps. The real-time data backbone maintains state information associated with the apps and facilitates communication between the plurality of apps and the PLC operating environment.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to extending the functionality of a programmable logic controller (PLC) using one or more discrete executable software applications, referred to herein as "apps." According to different embodiments described herein, an App Runtime Environment is installed on the PLC to facilitate execution of apps. This App Runtime Environment comprises an App Container which is logically separate from the PLC operating environment; thus, the apps can execute without affecting the functions of the PLC. In some embodiments, a data centric design is employed where apps and Skill Functions (SFs) interact only through a Real-Time Data Backbone (RTDB). This RTDB is a common data repository responsible for managing the published states of all the apps/SFs as well as providing, for example, persistency and history services. In this way, an App is decoupled from other apps or SFs, and is not tied together by communication endpoints. Accordingly, using the techniques described herein, the functionality of the PLC may be extended and customized without changing the existing PLC program.

Figure 1:
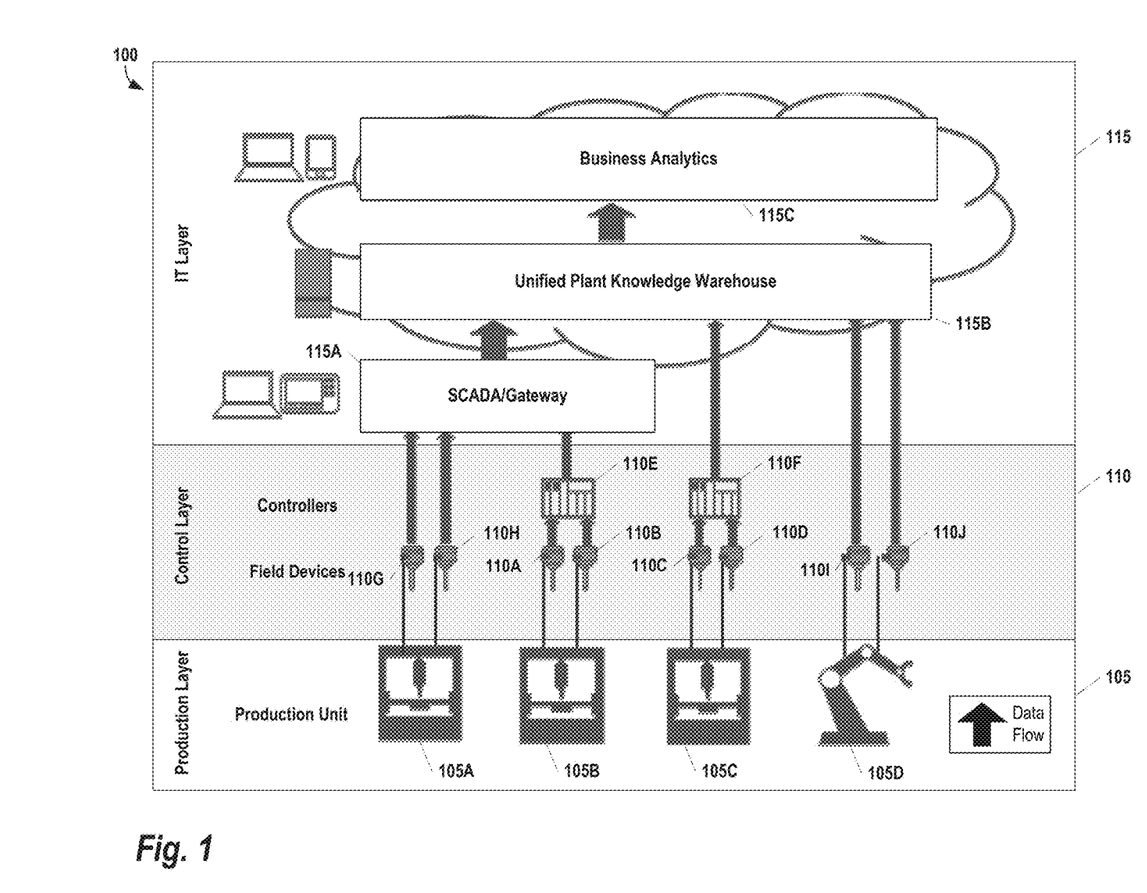
FIG. 1 provides an illustration of how apps may be integrated into an automation system, according to some embodiments of the present invention.

FIG. 1 provides an illustration of how apps may be integrated into an automation system 100, according to some embodiments of the present invention. This example conceptually partitions an industrial environment into a Production Layer 105, a Control Layer 110, and an IT Layer 115. In conventional systems, most data handling functions, as well as other functions in Manufacturing Execution System (MES) such as analytics, workflow and asset management, are performed at the IT Layer 115. However, using the techniques described herein, apps are installed at control layer devices to push many of these data handling functions down to the Control Layer 110. In the example of FIG. 1, the control layer devices include two Controllers 110E and 110F and eight Field Devices 110A, 110B, 110C, 110D, 110G, 110H, 110I, and 110J. As control layer devices, these controllers and field devices may be used to perform discrete automation functions (e.g., engineering) directly on the devices, thereby increasing their respective machine and process efficiency.

Briefly, data received from the Production Units (e.g., Units 105A, 105B, 105C, and 105D) is transferred by the Control Layer Devices to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for supporting Business Analytics 115C based on the data generated by the lower layers 105, 110.

One or more of the devices at the Control Layer 110 include an App Runtime Environment (RTE) which enables the execution of apps. Various functions can be performed by these applications. Example functions that may be performed by apps include tasks related to one or more of product engineering, production engineering, commissioning, sensing/acting, control, monitoring, optimization, collaboration, diagnostics, and business intelligence. For example, in some embodiments, each control layer device includes an App providing onboard engineering tools which allow a user to do basic configuration and engineering without the need of workstation engineering program. Additionally, because these apps are operating at the Control Layer 110, they may take advantage of data not typically made available at higher layers. For example, in some embodiments, the apps may enrich data using additional context dimensions such as control knowledge, environmental conditions, and service incidences. This allows insights to be made from data analytics with higher confidence and quality. The additional context dimensions may also yield new insights. Moreover, in some embodiments, enhanced devices may be used at the Control Layer 110 to extend the functionality traditionally available in control layer devices. For example, in some embodiments, programmable automation controllers (PACs) are used at the Control Layer 110 to co-locate certain SCADA/MES functionality on the same integrated process control hardware as the PLC, while preserving the legacy automation architecture shown in FIG. 1.

Figure 2:
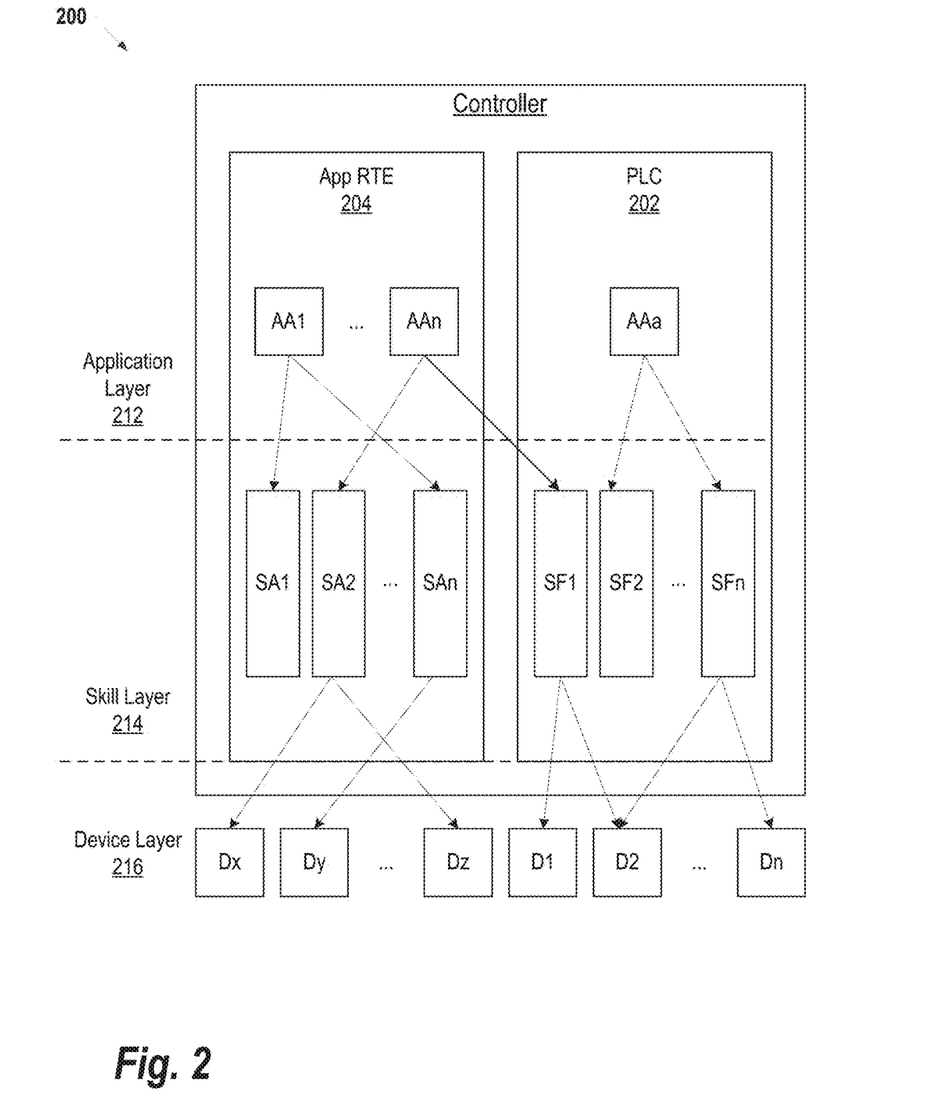
FIG. 2 illustrates a controller, according to some embodiments.

FIG. 2 illustrates a controller 200, according to some embodiments. The controller 200 in this example includes a PLC Environment 202 and an App RTE 204, which are logically separated from each other. Both PLC Environment 202 and App RTE 204 are divided into an Application Layer 212 and Skill Layer 214. At the Application Layer 212, a plurality of Application Layer apps are executed (AA1 . . . , AAn and AAa.) Each of the Skill Functions and Skill apps can logically relate to one or more devices in a Device Layer 216 (represented by Dx, Dy . . . Dz and D1, D2 . . . Dn). These devices may be, for example, an I/O or IT Device or any other device generally known in the art. In FIG. 2, an arrow between elements designates a logical relation. It should be noted that no device controlled by the PLC may be directly accessed from the App RTE 204 and vice versa.

In the Skill Layer 214, the App RTE comprises a plurality of Skill apps (represented by SA1, SA2 . . . SAn), while the PLC Environment 202 includes a plurality of Skill Functions (represented by SF1, SF2 . . . SFn). In this context, a skill represents a reusable, application agnostic function such as a specific behavior or capability of the production module or a system feature of the Controller 200. A skill may be as granular as a function block (FB) or function call (FC) or, alternatively, a skill may comprise a higher-level set of operations such as continuous function chart (CFC), sequential function chart (SFC), or organization block (OB). In this way, new functionality can be added to the Controller 200 using apps orchestrating these skills. Examples of Skill apps include key performance indicator (KPI) apps and communication apps.

Figure 3:
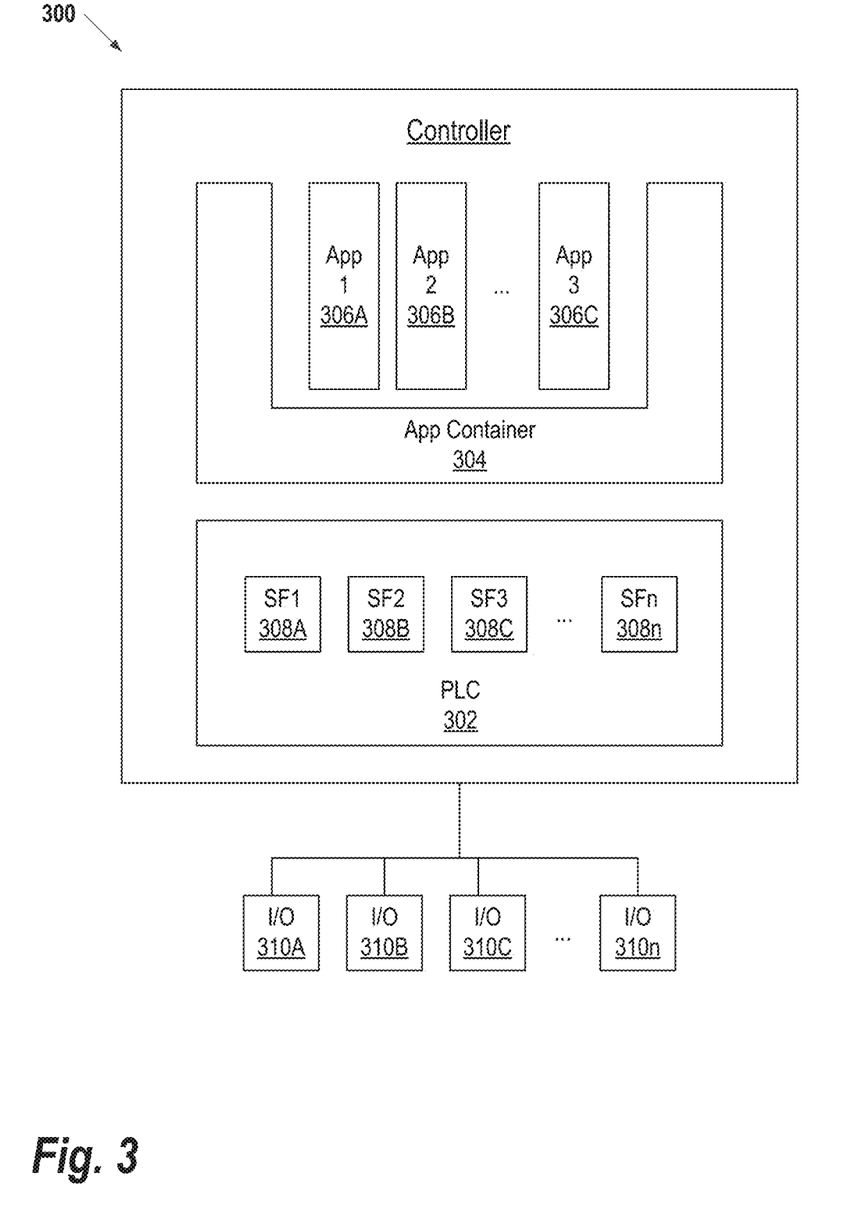
FIG. 3 illustrates a controller with PLC Environment and an App Container hosting apps, according to some embodiments.

FIG. 3 illustrates a controller 300 with PLC Environment 302 and an App Container 304 hosting apps 306A, 306B, and 306C, according to some embodiments. The App Container 304 has the ability to safeguard the proper running of the Controller 300 against misbehaving apps. Examples of the roles of the App Container 304 include, without limitation, lifetime management of apps (e.g., downloading, starting, initializing, scheduling, stopping and deleting an App), security sandboxing of apps, secure and controlled way for apps to access PLC data (e.g., the process image or databases), heartbeat monitoring and killing of non-responsive apps, and reclaiming resources from crashed apps. The Controller 300 includes a PLC Environment 302 that executes Skill Functions 308A, 308B, 308C, and 308n. Additionally, the Controller 300 can interact with I/O devices 310A, 310B, 310C, and 310n.

Figure 4:
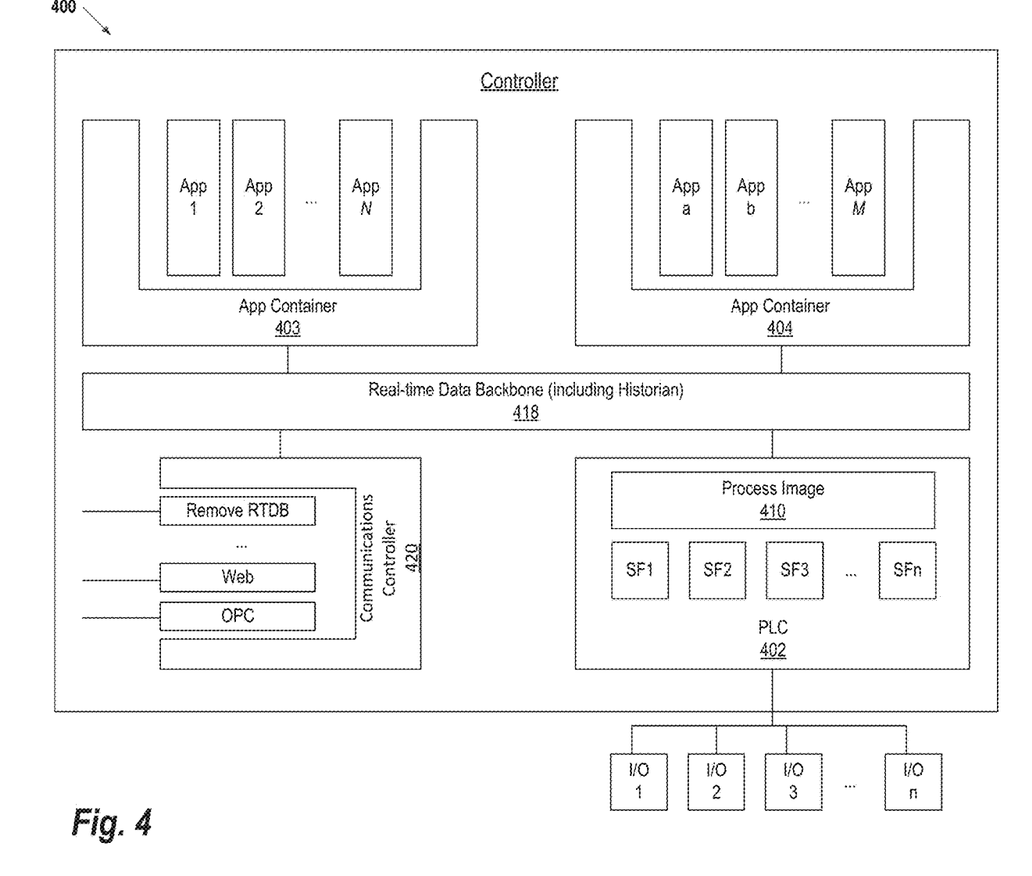
FIG. 4 illustrates a data-centric design for a Controller in accordance with disclosed embodiments.

FIG. 4 illustrates a data-centric design for a Controller 400 in accordance with disclosed embodiments. In this example, the Controller 400 includes a PLC Environment 402 with a Process Image 410 and Skill Functions SF1, SF2 . . . SNn. Additionally, the Controller 400 includes two App Containers 403, 404, each including one or more apps. Supporting multiple instances of App Containers allows for greater flexibility in structuring and grouping of apps within the Controller 400. For example, in some embodiments, one App Container 403 hosts cycle-synchronous apps and the other App Container 404 hosts hosting free-running apps.

As noted above, one significant benefit of an App approach is the flexibility due to the notion of plug and play in run. Thus, a new App can be downloaded and started (or terminated and removed) without having to put the system to stop. In the example of FIG. 4, this is achieved by a data centric design where apps in the App Containers 403, 404 and SFs in the PLC Environment 402 interact only through the RTDB 418. The RTDB is a common data repository responsible for managing the published states of all the apps/SFs as well as providing, for example, persistency and history services. In this way, an App is decoupled from other apps/SFs so that they are not tied together by communication endpoints. RTDB 418 can also communicate with a Communications Container 420, which can then communicate with external data sources or outputs. For example, as shown in FIG. 4, these external data sources may include remote RTDBs, web sites or interfaces, and open connectivity (OPC) interfaces. Note that this data driven paradigm is only enforced, in some embodiments, for App-to-App/SF interactions. There may or may not be a similar constraint for interactions with and between system components (e.g. App-to-Container, Container-to-RTDB, RTDB-to-PLC), which may well involve, for example, message passing operations.

In some embodiments, the RTDB 418 is implemented as an event bus that uses push technology to distribute data to the apps in the App Containers 403, 404 and SFs in the PLC Environment 402 in a low-latency manner. The RTDB 418 is conceptually similar to a stock exchange display board. Apps and SFs are like floor traders, polling the information available on the board. This is not the usual event bus paradigm utilized by conventional system. An Application Programming Interface (API) may be used by the apps and SFs to distribute information using event-based message paradigms such as, without limitation, publish/subscribe, peer-to-peer, and remote procedure call. In addition to basic communications, in some embodiments, the RTDB 418 may provide other data processing functions such as monitoring of data transfers, logging of data transfers, generating alerts based on data transfer, and facilitating secure communications with respect to data transfers. Generic event buses which are known in the art may be adapted for use as the RTDB 418 or, alternatively, the event bus can be developed especially for use in the Controller 400. For example, the latter approach may be used where existing solutions cannot meet the latency requirements of the Controller 400.

Figure 5:
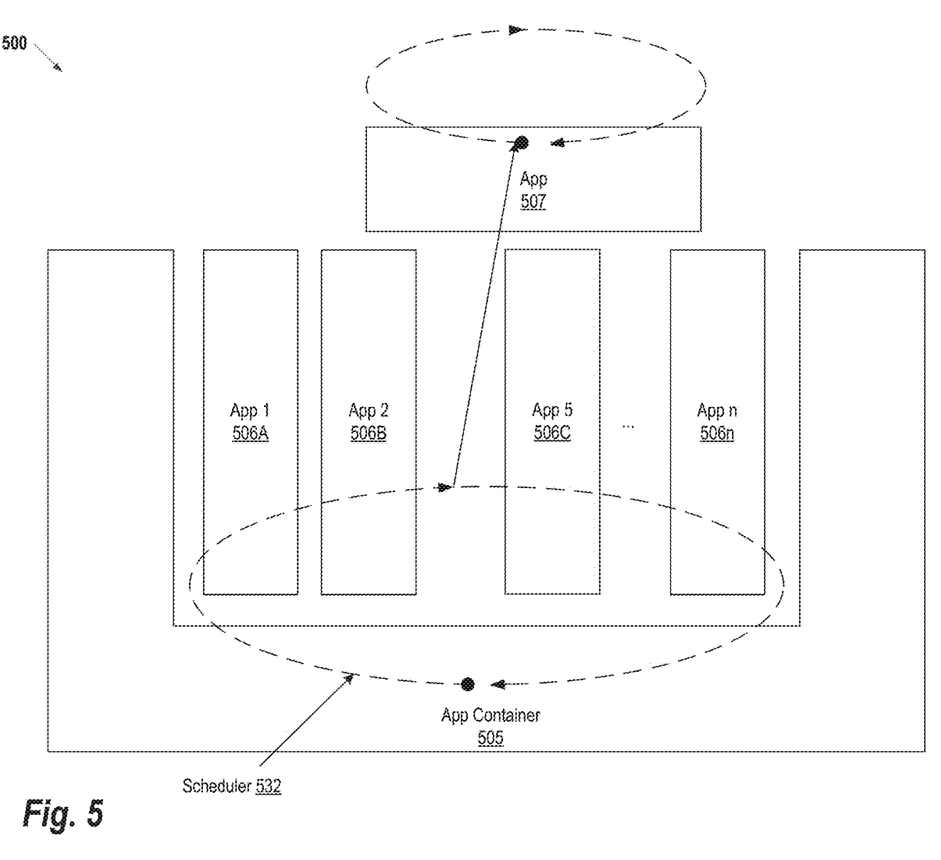
FIG. 5 illustrates how an App Container may support both synchronous and asynchronous execution models, according to some embodiments.

FIG. 5 shows a portion of a Controller 500 illustrating how an App Container 505 may support both synchronous and asynchronous execution models, according to some embodiments. The App Container 505 provides a mechanism to execute a group of apps 506A, 506B, 506C . . . 506n in sequence. Apps belonging to the same sequence are executed by a single threaded scheduler 532 sequentially in an order predefined at configuration time. This type of execution model is typically used for automation and control applications such as material flow control. The App Container 505 may host more than one such sequence, each executed by its own scheduler. In addition to the sequentially executed apps, the App Container 505 has an App 507 that executes according to an un-sequenced execution model. This App 507 runs asynchronously in its own thread when triggered (e.g., by a trigger such as timer or a change of value in the RTDB). Un-sequenced execution may be used, for example, in the execution of IT-centric apps such as generation of the end of shift report.

To provide a robust set of options, the App Container 505 may provide a variety of models that can be used for executing individual apps. Thus, the execution model may be selected based on functionality of the App. In some embodiments, the App Container 505 may be configured to support other techniques for executing apps. For example, apps may be defined at configuration time as synchronous or asynchronous. Then, the App Container 505 may execute synchronous apps in the same thread as the scheduler (e.g., using the sequential execution model discussed above). Conversely the App Container 505 may execute each asynchronous App in a separate thread that runs asynchronously to the scheduler (e.g., using the un-sequenced execution model discussed above). In some embodiments, synchronous execution may be selectively applied based on the processing requirements of the App. For example, it is expected that all apps included in the sequence executed by the scheduler 532 will complete before the end of a scan. To balance the need for shorter cycle times, long running apps may be configured to execute asynchronously in their own threads once they are sequenced to run.

In some embodiments, the App container 505 provides two execution modes for the App scheduler: event driven or scan based. Event driven sequences can be used, for example, to support IT oriented applications. For example, an end-of-shift event may trigger a sequence in which App1 would generate a report, App2 a maintenance order, and so on. In other embodiments, cyclic, scan based execution can be used, for example, for automation and control applications where the corresponding process is under constant monitoring. For example, in each scan, App1 determines the state of the machine, App2 determines the machine resource availability, App3 determines which of the work pieces in the input buffer can be processed, and so on.

Figure 6:
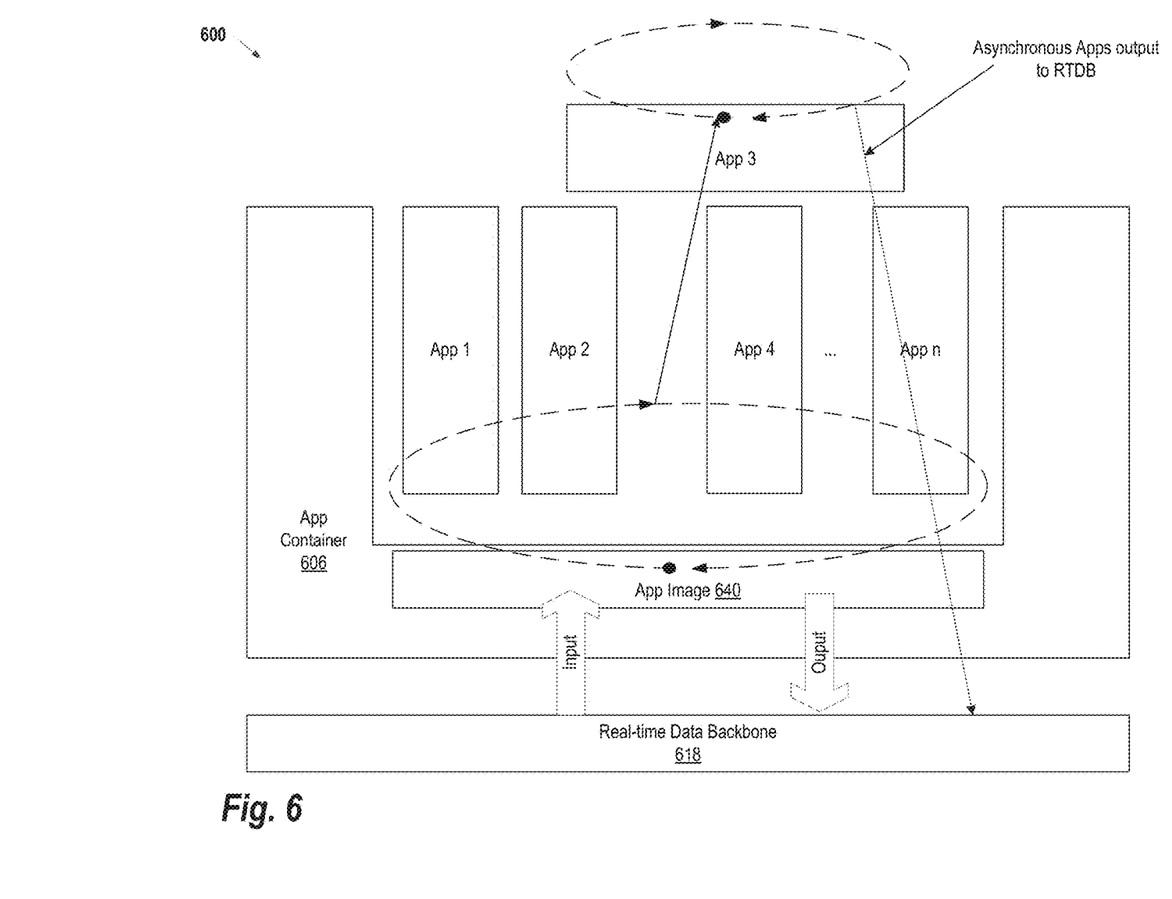
FIG. 6 illustrates the use of an App Image by the App Container, according to some embodiments.

FIG. 6 shows a portion of a Controller 600 illustrating the use of an App Image 640 by the App Container 606, according to some embodiments. This example extends the general concepts discussed above with respect to FIG. 5. An automation function typically involves cyclic execution of apps in pre-defined sequence. For example, in a real-time material flow control, upon completion of a work piece operation, App 1 would determine from the production workflow the next operation to be performed, App 2 would determine which production module to use for next operation, App 3 would choose the transport means and so on. For consistency, the App Container 606 implements an App Image 640 (e.g., a local shared memory) which is updated with the most current data from the RTDB 618 at the start of a scan before execution of the apps begins. This ensures all apps in the same sequence read the same input values, decoupled from subsequent changes in the RTDB 618.

Figure 7:
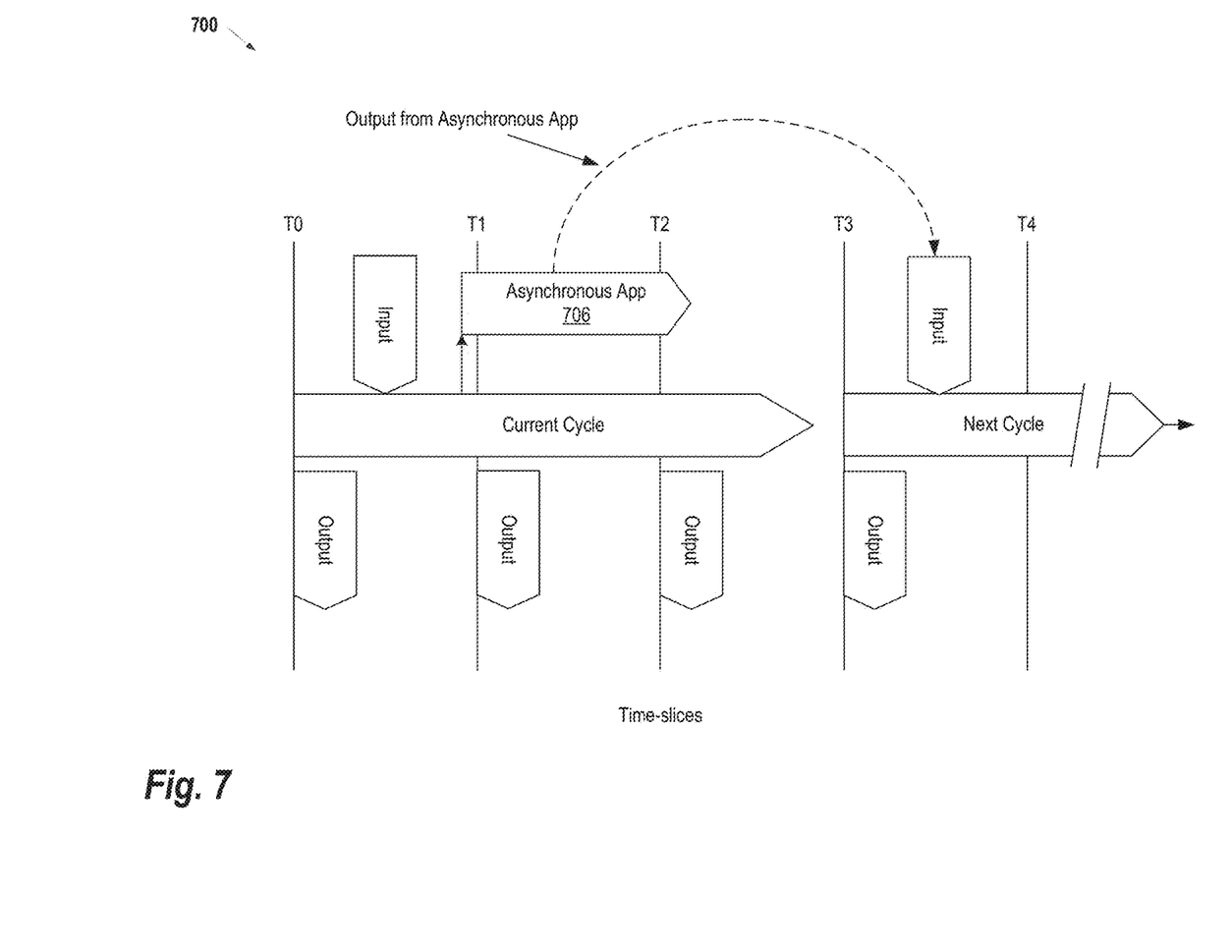
FIG. 7 illustrates a timing diagram with respect to an asynchronous App, as it may be implemented in some embodiments.

FIG. 7 illustrates a timing diagram 700 with respect to an asynchronous App, as it may be implemented in some embodiments. For determinism, the app container implements a time-sliced scheduler. The cycle time of the schedule is a multiple of the configured time-slice. By default, the scheduler updates the RTDB with changed app image values of the current scan at the beginning of the next scan. This ensures time-equidistance output critical for such automation tasks as motion control. Asynchronous apps 706 are executed as sequenced and read their input from the app image in the app container. Since no subsequent apps can count on the timing of their output, they may write directly to the RTDB.

Figure 8A:
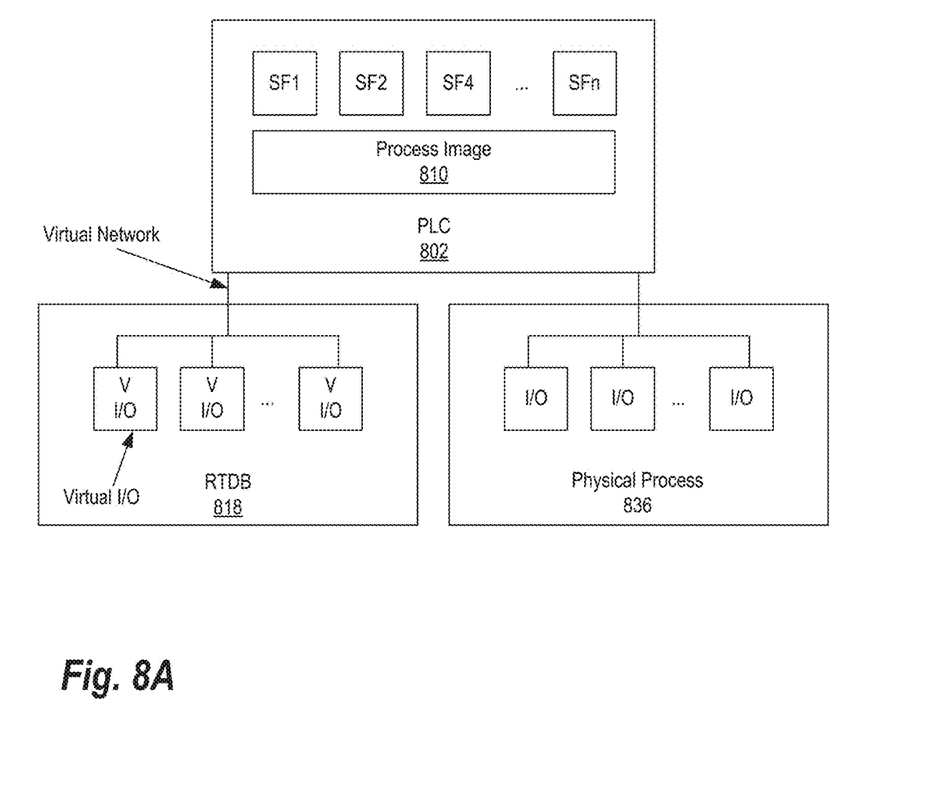
FIG. 8A provides an illustration of how a PLC can communicate with Apps via a Real-Time Data Backbone as virtual I/O, according to some embodiments.

FIG. 8A provides an illustration of how a PLC can communicate with Apps via a Real-Time Data Backbone as virtual I/O, according to some embodiments. In this example, the PLC 802 exchanges data synchronously with RTDB 818 in a secure and controlled manner via the PLC I/O mechanism. Here, data in the process image 810 would be mapped to data in the RTDB 818 as virtual I/O (which can be similar to physical I/O to physical process 836).

Figure 8B:
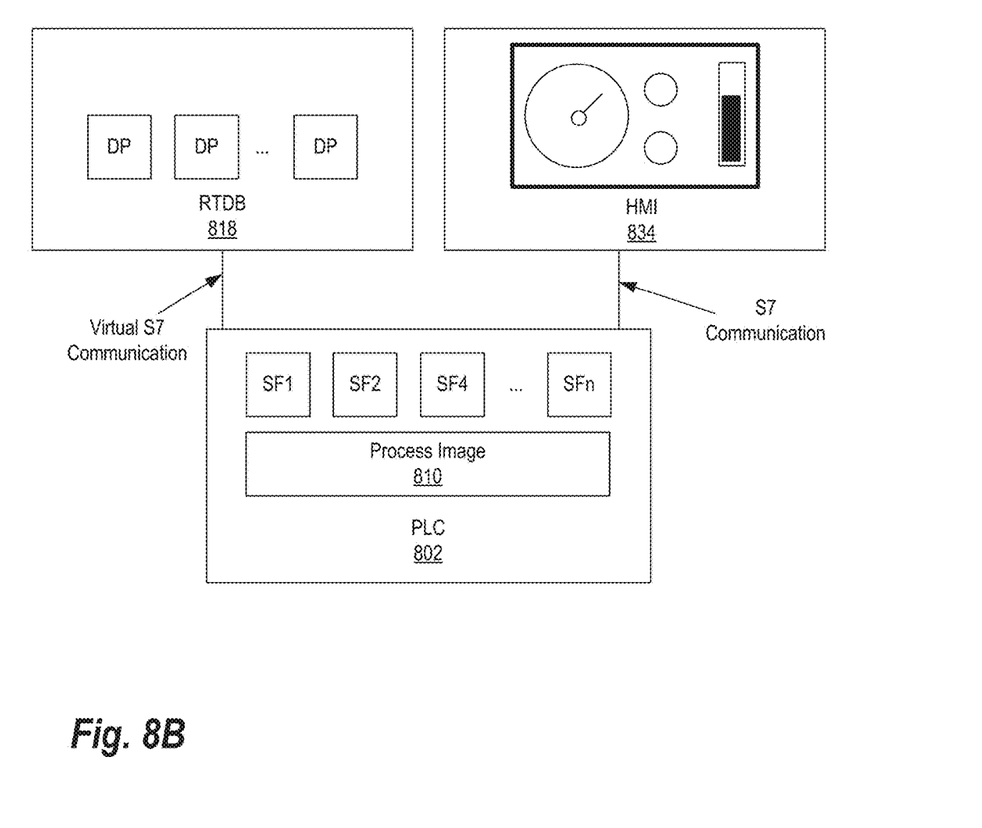
FIG. 8B provides an illustration of a how a PLC can communicate with Apps via a Real-Time Data Backbone as a virtual S7 communication mechanism, according to some embodiments.

FIG. 8B provides an illustration of a how a PLC can communicate with Apps via a Real-Time Data Backbone as a virtual S7 communication mechanism, according to some embodiments. This example may be applied for asynchronous exchange of bulk data between RTDB 818 and the PLC 802. In FIG. 8B, an S7 communication mechanism (e.g., BSEND/BRCV) for data exchange between PLC 802 and human-machine interface (HMI) 834. Here, only a virtual S7 communication protocol may be implemented. Thus, the protocol is only implemented at the application layers and not the physical layers of the protocol stack.

The processors described herein as used by programmable logic controllers may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the programmable logic controllers and related computing infrastructure may comprise at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

In the present application, the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A programmable logic controller comprising:
a processor;
a programmable logic controller (PLC) operating environment configured to execute a controller automation program providing a plurality of skill functions;
a device memory comprising a plurality of apps configured to perform a discrete set of automation functions using the plurality of skill functions; and
an app container that is logically separate from the PLC operating environment, wherein the app container is configured to provide a runtime environment for the plurality of apps.

2. The programmable logic controller of claim 1, further comprising a real-time data backbone configured to maintain state information associated with the plurality of skill functions, the plurality of apps, and one or more processes under control of the programmable logic controller.

3. The programmable logic controller of claim 2, further comprising a communications container configured to facilitate communication between the real-time data backbone and one or more external sources.

4. The programmable logic controller of claim 3, wherein the one or more external sources comprise a second real-time data backbone in a second programmable logic controller.

5. The programmable logic controller of claim 2, wherein the app container comprises a local shared memory and the app container is further configured to (i) update the local shared memory prior to execution of the plurality of apps during a scan cycle and (ii) write any changes to the real-time data backbone at the beginning of a subsequent scan cycle immediately following the scan cycle.

6. The programmable logic controller of claim 1, wherein the plurality of apps comprises one or more app sequences and the app container is configured to execute each of the one or more app sequences in one or more single threaded schedulers.

7. The programmable logic controller of claim 6, wherein the app container is configured to sequentially execute apps included in each of the one or more app sequences.

8. The programmable logic controller of claim 7, wherein each of the one or more app sequences is executed by a distinct single threaded scheduler.

9. The programmable logic controller of claim 8, wherein the plurality of apps comprises one or more un-sequenced apps executing asynchronously in a thread distinct from each distinct single thread scheduler used to execute to the one or more app sequences.

10. The programmable logic controller of claim 1, wherein the app container is configured to trigger execution of at least a first portion of the plurality of apps in response to receive an indication of an external event.

11. The programmable logic controller of claim 10, wherein the app container is configured to execute a second portion of the plurality of apps according to a scan cycle.

12. A programmable logic controller comprising:
a programmable logic controller (PLC) operating environment configured to execute a controller automation program providing a plurality of skill functions;
a device memory comprising a plurality of apps configured to perform a discrete set of automation functions using the plurality of skill functions;
a first instance of an app container that is logically separate from the PLC operating environment, wherein the first instance of the app container is configured to provide a first runtime environment for a first subset of the plurality of apps;
a second instance of the app container that is logically separate from the PLC operating environment, wherein the second instance of the app container is configured to provide a second runtime environment for a second subset of the plurality of apps.

13. The programmable logic controller of claim 12, wherein
the first subset of the plurality of apps comprises one or more cycle-synchronous apps; and
the second subset of the plurality of apps comprises one or more free running apps.

14. The programmable logic controller of claim 12, further comprising a real-time data backbone operably coupled to the first instance of the app container and the second instance of the app container, wherein the real-time data backbone is configured to maintain state information associated with the plurality of apps and one or more processes under control of the programmable logic controller.

15. The programmable logic controller of claim 14, further comprising a communications container configured to facilitate communication between the real-time data backbone and one or more external sources.

16. The programmable logic controller of claim 14, wherein the first instance of the app container and the second instance of the app container each comprise a local shared memory updated with app state information during a scan cycle of the programmable logic controller.

17. The programmable logic controller of claim 16, wherein any changes to the local shared memory are written to the real-time data backbone at the beginning of a subsequent scan cycle immediately following the scan cycle.

18. The programmable logic controller of claim 12, wherein the first subset of the plurality of apps comprises one or more app sequences and the first instance of the app container is configured to execute each of the one or more app sequences in a distinct single threaded scheduler.

19. The programmable logic controller of claim 18, wherein the first instance of the app container is configured to sequentially execute apps included in each of the one or more app sequences.

20. The programmable logic controller of claim 19, wherein the first instance of the app container is further configured to execute at least one of the apps asynchronously in a thread which is separate from execution of other apps included in each of the one or more app sequences.

21. The programmable logic controller of claim 18, wherein the second subset of the plurality of apps comprises one or more un-sequenced apps executing asynchronously in a thread distinct from each distinct single thread scheduler used to execute to the one or more app sequences.

22. A programmable logic controller comprising:
a programmable logic controller (PLC) operating environment configured to execute a controller automation program providing a plurality of skill functions;
one or more app containers that are logically separate from the PLC operating environment configured to provide a runtime environment for a plurality of apps; and
a real-time data backbone configured to maintain state information associated with the plurality of apps and to facilitate communication between the plurality of apps and the programmable logic controller (PLC) operating environment.

* * * * *